United States Patent
Ro et al.

(10) Patent No.: US 11,252,371 B2
(45) Date of Patent: Feb. 15, 2022

(54) APPARATUS AND METHOD FOR VIRTUAL REALITY SICKNESS REDUCTION BASED ON VIRTUAL REALITY SICKNESS ASSESSMENT

(71) Applicant: KOREA ADVANCED INSTITUTE OF SCIENCE AND TECHNOLOGY, Daejeon (KR)

(72) Inventors: YongMan Ro, Daejeon (KR); Hak Gu Kim, Daejeon (KR); Sangmin Lee, Daejeon (KR)

(73) Assignee: KOREA ADVANCED INSTITUTE OF SCIENCE AND TECHNOLOGY

( * ) Notice: Subject to any disclaimer, the term of this patent is extended or adjusted under 35 U.S.C. 154(b) by 0 days.

(21) Appl. No.: 16/985,333

(22) Filed: Aug. 5, 2020

(65) Prior Publication Data
US 2021/0185275 A1    Jun. 17, 2021

(30) Foreign Application Priority Data
Dec. 13, 2019    (KR) .......................... 10-2019-0166575

(51) Int. Cl.
*H04N 7/01* (2006.01)
*G06N 3/08* (2006.01)
(Continued)

(52) U.S. Cl.
CPC ............ *H04N 7/0137* (2013.01); *G06N 3/08* (2013.01); *G06T 7/0002* (2013.01); *G06T 7/20* (2013.01);
(Continued)

(58) Field of Classification Search
CPC .................................................. G06T 19/006
See application file for complete search history.

(56) References Cited

U.S. PATENT DOCUMENTS

2018/0096518 A1* 4/2018 Mallinson ............... A63F 13/53
2019/0384382 A1* 12/2019 Hasegawa ................. G06F 3/01
2020/0327408 A1* 10/2020 Ro ........................ G06N 3/0472

FOREIGN PATENT DOCUMENTS

KR        20170105905 A      9/2017

OTHER PUBLICATIONS

Jin W, Fan J, Gromala D, Pasquier P. Automatic prediction of cybersickness for virtual reality games. In2018 IEEE Games, Entertainment, Media Conference (GEM) Aug. 15, 2018 (pp. 1-9). IEEE. (Year: 2018).*

(Continued)

*Primary Examiner* — Clifford Hilaire
(74) *Attorney, Agent, or Firm* — Hoffman Warnick LLC

(57) ABSTRACT

Disclosed is an apparatus and method for VR sickness reduction based on VR sickness assessment. According to an embodiment of the inventive concept, an apparatus for reducing virtual reality (VR) content cybersickness includes a first module extracting feature information about each of predetermined cybersickness precipitating factors through analysis of VR content, and a second module determining a cybersickness precipitating factor requiring cybersickness reduction among the cybersickness precipitating factors based on the extracted feature information about each of the cybersickness precipitating factors, and generating the VR content as VR content having a cybersickness score not greater than a predetermined reference cybersickness score, by performing the cybersickness reduction on corresponding feature information, using a deep learning neural network pre-learned for each of the respective determined cybersickness precipitating factor.

8 Claims, 6 Drawing Sheets

(51) Int. Cl.
*G06T 7/00* (2017.01)
*G06T 7/20* (2017.01)
(52) U.S. Cl.
CPC ......... *H04N 7/0117* (2013.01); *H04N 7/0127* (2013.01); *G06T 2207/20084* (2013.01); *G06T 2207/30168* (2013.01)

(56) References Cited

OTHER PUBLICATIONS

Mun et al., "Overview of VR Media Technology and Methods to Reduce Cybersickness", JBE vol. 23, No. 6, Nov. 2018.

* cited by examiner

APPARATUS AND METHOD FOR VIRTUAL REALITY SICKNESS REDUCTION BASED ON VIRTUAL REALITY SICKNESS ASSESSMENT

CROSS-REFERENCE TO RELATED APPLICATIONS

A claim for priority under 35 U.S.C. § 119 is made to Korean Patent Application No. 10-2019-0166575 filed on Dec. 13, 2019, in the Korean Intellectual Property Office, the entire contents of which are hereby incorporated by reference.

BACKGROUND

Embodiments of the inventive concept described herein relate to a technology for reducing cybersickness of virtual reality (VR) content, and more particularly, relate to an apparatus and method for reducing cybersickness of VR content based on analysis of cybersickness precipitating factor feature information.

With the recent development of displays such as a 3D display, a head mount display (HMD), or the like, as an interest in VR content grows, the VR-related market is expanding significantly in various fields such as games, broadcasting, and entertainment.

VR content refers to content that gives viewers immersion as if the viewers are actually experiencing an image or video which the viewers are watching. Generally, the VR content that is photographed and produced to provide a realistic immersion to the viewers has characteristics such as stereo format, 360-degree video information, fast and many movements, and the like. However, it is known that about 70-80% of viewers experience severe fatigue or cybersickness when watching the VR content with high immersion, because of these characteristics.

Furthermore, it is known that most viewers who felt fatigue or cybersickness when watching the VR content, experience this phenomenon persisting even after viewing. To prevent these side effects and to watch and produce safe VR content, development of technology to reduce cybersickness of VR content is very urgent.

In the case of viewers of VR content, the safe VR content produced through a VR content cybersickness reduction technology may be provided. In the case of producers of VR content, safer VR content may be produced by controlling the degree of cybersickness of VR content that causes severe cybersickness, through the VR content cybersickness reduction technology. However, nowadays, there are few studies for analyzing and reducing the cybersickness factor of VR.

There are various VR content characteristics, in factors that cause fatigue and cybersickness when the VR content is watched. For example, there are fast and complex motion, the low resolution of an image, the low frame rate of an image, and the like.

Accordingly, there is a need for a VR content cybersickness reduction technology capable of automatically reducing factors that may cause fatigue, or the like analyzed by the VR cybersickness analysis and evaluation module from the VR content.

SUMMARY

Embodiments of the inventive concept provide an apparatus and method for reducing cybersickness of VR content based on analysis of cybersickness precipitating factor feature information.

Furthermore, embodiments of the inventive concept provide an apparatus and method that may extract feature information of each of cybersickness precipitating factors through VR content analysis, and may reduce the cybersickness precipitating feature of the corresponding VR content using a deep learning neural network based on the extracted feature information.

According to an exemplary embodiment, an apparatus for reducing virtual reality (VR) content cybersickness includes a first module extracting feature information about each of predetermined cybersickness precipitating factors through analysis of VR content, and a second module determining a cybersickness precipitating factor requiring cybersickness reduction among the cybersickness precipitating factors based on the extracted feature information about each of the cybersickness precipitating factors, and generating the VR content as VR content having a cybersickness score not greater than a predetermined reference cybersickness score, by performing the cybersickness reduction on corresponding feature information, using a deep learning neural network pre-learned for each of the respective determined cybersickness precipitating factor.

The first module may analyze the VR content based on deep learning, and may extract the feature information about each of the cybersickness precipitating factors including a motion feature, a resolution feature, and a frame rate feature.

The second module may generate the VR content as the VR content having the cybersickness score not greater than the predetermined reference cybersickness score, by sequentially performing the cybersickness reduction for feature information of the respective determined cybersickness precipitating factor on the VR content.

The second module may calculate a cybersickness score of the VR content based on the feature information of each of the cybersickness precipitating factors, may calculate a gradient size in each feature information about the calculated cybersickness score, and may determine a cybersickness precipitating factor requiring the cybersickness reduction by analyzing influence information of the respective feature information about the cybersickness score based on the calculated gradient size.

The second module may include a first deep neural network generating a frame of the VR content as a frame of a predetermined reference motion or less when the VR content has a motion feature of the predetermined reference cybersickness score or more, a second deep neural network upscaling a resolution for the frame of the VR content to a predetermined high resolution when the VR content has a resolution of the reference cybersickness score or more, and a third deep neural network generating an interpolation frame for frames of the VR content when the VR content has a frame rate of the reference cybersickness score or more.

According to an exemplary embodiment, a method for reducing VR content cybersickness includes extracting feature information about each of predetermined cybersickness precipitating factors through analysis of VR content, and determining a cybersickness precipitating factor requiring cybersickness reduction among the cybersickness precipitating factors based on the extracted feature information about each of the cybersickness precipitating factors, and generating the VR content as VR content having a cybersickness score not greater than a predetermined reference cybersickness score, by performing the cybersickness reduction on corresponding feature information, using a deep learning neural network pre-learned for each of the respective determined cybersickness precipitating factor.

The extracting may include analyzing the VR content based on deep learning and extracting the feature information about each of the cybersickness precipitating factors including a motion feature, a resolution feature, and a frame rate feature.

The generating may include generating the VR content as the VR content having the cybersickness score not greater than the predetermined reference cybersickness score, by sequentially performing the cybersickness reduction for feature information of the respective determined cybersickness precipitating factor on the VR content.

The determining may include calculating a cybersickness score of the VR content based on the feature information of each of the cybersickness precipitating factors, calculating a gradient size in each feature information about the calculated cybersickness score, and determining a cybersickness precipitating factor requiring the cybersickness reduction by analyzing influence information of the respective feature information about the cybersickness score based on the calculated gradient size.

The generating may include performing the cybersickness reduction for the corresponding feature information, using a first deep neural network generating a frame of the VR content as a frame of a predetermined reference motion or less when the VR content has a motion feature of the predetermined reference cybersickness score or more, a second deep neural network upscaling a resolution for the frame of the VR content to a predetermined high-resolution when the VR content has a resolution of the reference cybersickness score or more, and a third deep neural network generating an interpolation frame for frames of the VR content when the VR content has a frame rate of the reference cybersickness score or more.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
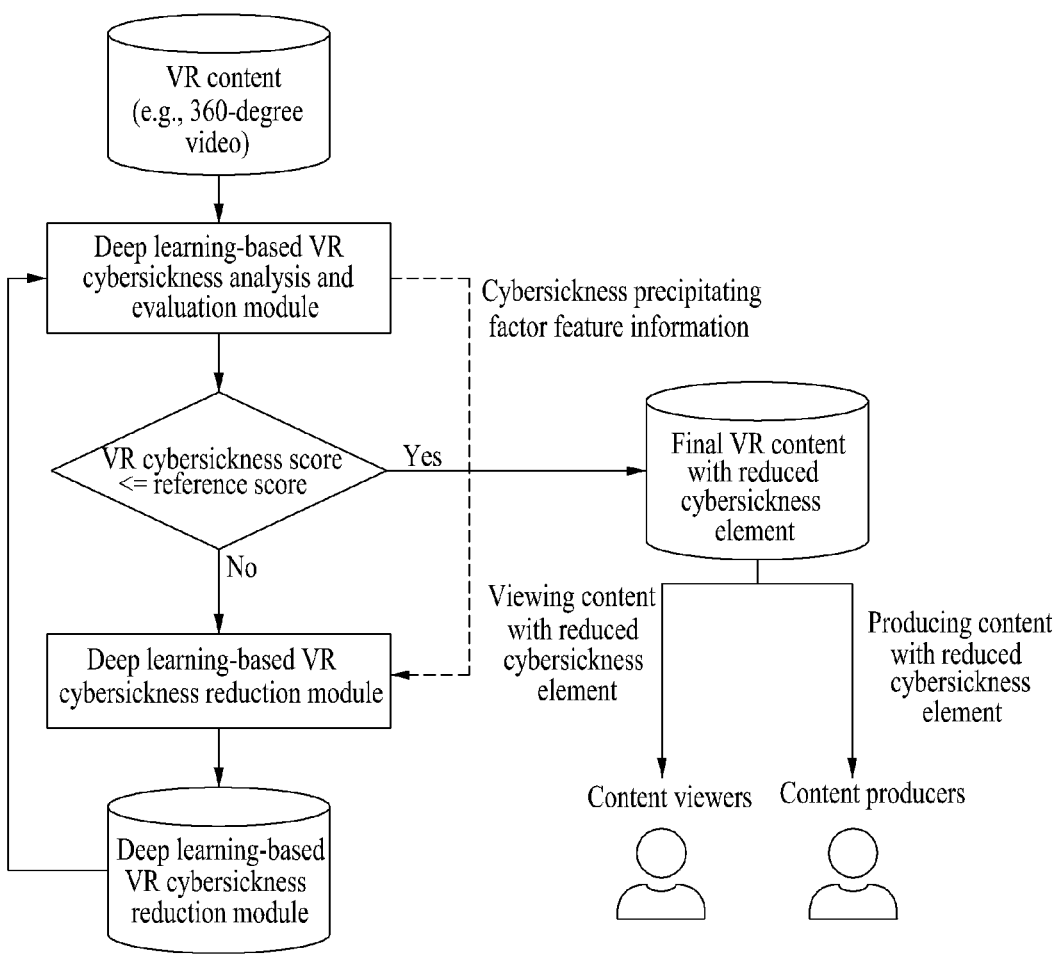
FIG. 1 illustrates a configuration for a VR content cybersickness reduction system according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the present disclosure will be thorough and complete, and will fully convey the concept of the inventive concept to those skilled in the art. The inventive concept may be defined by scope of the claims. Meanwhile, the terminology used herein to describe embodiments of the inventive concept is not intended to limit the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other components, steps, operations, and/or elements in addition to the aforementioned components, steps, operations, and/or elements.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings. The same reference numerals are used for the same components in the drawings and redundant explanations for the same components are omitted.

The embodiments of the inventive concept aim to reduce the cybersickness of the VR content based on the analysis of cybersickness precipitating factor.

At this time, the inventive concept may analyze a VR cybersickness precipitating factor (e.g., a motion feature, a resolution feature, a frame rate feature, or the like) through the analysis of VR content, and may reduce the analyzed VR cybersickness precipitating factor, which is a temporal cybersickness element and a spatial cybersickness element, to a preset level using the preset image processing technology (e.g., a deep learning neural network, or the like), thereby reducing the cybersickness of VR content.

The inventive concept may include a VR cybersickness reduction module that reduces each cybersickness precipitating feature by utilizing various deep learning image processing technologies based on a recursive cybersickness reduction framework that repeatedly performs reduction to the desired cybersickness precipitating level depending on the degree of cybersickness measured by a VR cybersickness analysis and evaluation module, and the cybersickness precipitating factor feature information of the analyzed VR content image.

FIG. 1 illustrates a configuration for a VR content cybersickness reduction system according to an embodiment of the inventive concept.

Referring to FIG. 1, a VR content cybersickness reduction system according to an embodiment of the inventive concept includes a deep learning-based VR cybersickness analysis and evaluation module and a deep learning-based VR cybersickness reduction module.

When the VR content (e.g., a 360-degree VR video image) for reducing cybersickness is input or received, the VR cybersickness analysis and evaluation module analyzes the input VR content based on deep learning to extract feature information about each of the VR cybersickness precipitating factors, and determines whether the VR cybersickness score evaluated based on the extracted feature information is not greater than a reference score at a level desired to be reduced. Herein, when the evaluated VR cybersickness score is greater than the reference score, there is a need to reduce the cybersickness, and thus it is possible to provide feature information of each cybersickness precipitating factor extracted by the VR cybersickness reduction module. On the other hand, when the evaluated VR cybersickness score is not greater than the reference score, it is determined that the cybersickness is reduced to the desired level, and thus the cybersickness factor is stored as the reduced final VR content. The final VR content in which the cybersickness element is reduced may help the VR content viewing of a content viewer and the VR content production of a content producer. For example, content viewers may reduce the degree of cybersickness to an appropriate level in the content that is likely to cause fatigue or cybersickness to watch safe content suited to individual characteristics; VR content producers may help to produce the safer VR content by adjusting the degree of fatigue or cybersickness of the VR content produced to an appropriate level by themselves.

The VR cybersickness reduction module generates the VR content with the reduced cybersickness element by reducing the cybersickness precipitating factor of the VR content based on deep learning.

At this time, VR cybersickness reduction module may reduce each of the cybersickness precipitating factors based on deep learning, based on the feature information of each cybersickness precipitating factor received from the VR cybersickness analysis and evaluation module, and thus may generate the VR content with the reduced cybersickness element through reducing each of the cybersickness precipitating factors.

The VR content with the reduced cybersickness element is processed by the VR cybersickness analysis and evaluation module again; the VR cybersickness analysis and evaluation module determines whether the cybersickness score reaches the reference score; when it is determined that the reduction is reached to the desired level, the reduction process is terminated; otherwise, the reduction process is repeated. A process of reducing the cybersickness element of VR content may be automatically achieved using the VR cybersickness reduction system.

Furthermore, the VR cybersickness reduction module may calculate a cybersickness score of VR content based on each feature information of the cybersickness precipitating factor, may calculate the gradient size in each feature information about the cybersickness score, using algorithms such as guided backpropagation, or the like, to analyze the degree of influence of each feature information about the cybersickness score, and thus the VR cybersickness reduction module may determine to perform reduction on the corresponding feature when the degree of influence of a feature exceeds a preset reference value and may reduce the determined feature information of the cybersickness precipitating factor to reduce the cybersickness of the VR content.

Herein, the VR cybersickness reduction module may concatenate feature vectors corresponding to feature information of each cybersickness precipitating factor, and then may use a method for returning to the cybersickness score by applying fully connected layers. Accordingly, the VR cybersickness reduction module may calculate the cybersickness score of VR content.

Figure 2:
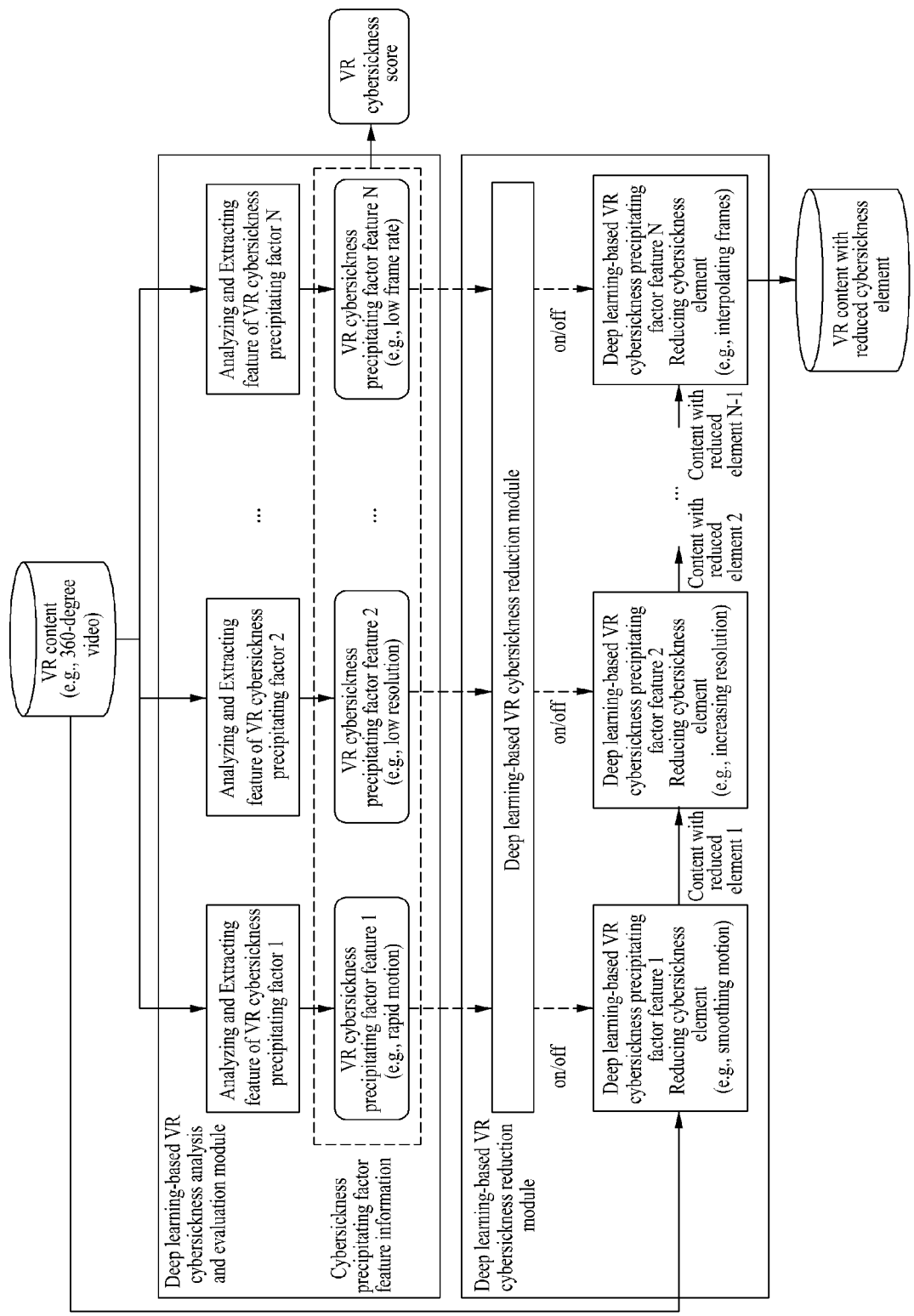
FIG. 2 illustrates an exemplary view for describing an operation of a system according to an embodiment of the inventive concept.

FIG. 2 illustrates an exemplary view for describing an operation of a system according to an embodiment of the inventive concept, and illustrates an exemplary view for describing an operation in each module illustrated in FIG. 1 in detail.

As illustrated in FIG. 2, the VR cybersickness analysis and evaluation module analyzes each of cybersickness precipitating factors (e.g., a motion level, a resolution level, or a frame rate level) of VR content based on deep learning and extracts each feature information. That is, the VR cybersickness analysis and evaluation module analyzes and extracts each preset cybersickness precipitating factors (e.g., VR cybersickness precipitating factor 1 to VR cybersickness precipitating factor N) through analysis of VR content, and thus extracts feature information of each of VR cybersickness precipitating factor 1 to VR cybersickness precipitating factor N. For example, the VR cybersickness analysis and evaluation module extracts a VR cybersickness precipitating feature 1 (e.g., rapid motion), by analyzing and extracting features of VR cybersickness precipitating factor 1 from VR content; the VR cybersickness analysis and evaluation module extracts a VR cybersickness precipitating feature 2 (e.g., a resolution lower than the reference resolution) by analyzing and extracting features of VR cybersickness precipitating factor 2 from VR content; the VR cybersickness analysis and evaluation module extracts a VR cybersickness precipitating feature N (e.g., a frame rate lower than the reference frame rate) by analyzing and extracting features of VR cybersickness precipitating factor N from VR content. Moreover, the cybersickness score of the VR content may be calculated using the feature information of each extracted cybersickness precipitating factors. Herein, the VR cybersickness analysis and evaluation module may provide frame information and feature information about each of cybersickness precipitating factors through the analysis of VR content as a result; the VR cybersickness analysis and evaluation module may calculate the VR cybersickness score using the results thus provided; also, the VR cybersickness score may be used as input information of the VR cybersickness reduction module.

The VR cybersickness reduction module is composed of a portion that determines whether the cybersickness precipitating factor is reduced and a portion that performs reduction on each cybersickness precipitating feature. The deep learning-based VR cybersickness reduction module receives feature information and VR content for each cybersickness precipitating factors extracted by the VR cybersickness analysis and evaluation module.

At this time, feature information of each of the cybersickness precipitating factors may have rapid motion, low resolution, low frame rate, or the like; the cybersickness precipitating factors are not limited to the above descriptions; the feature information may include all cybersickness precipitating factors that may cause VR cybersickness.

The determination unit that determines whether or not the cybersickness precipitating factor is reduced receives feature information of each cybersickness precipitating factors extracted by the VR cybersickness analysis and evaluation module and determines whether to reduce the corresponding feature. How much each cybersickness precipitating feature affects a high cybersickness score needs to be considered to determine whether it is need to reduce each feature.

At this time, the determination unit may analyze how much each cybersickness precipitating feature affects the predicted high VR cybersickness score, using an algorithm such as guided backpropagation; when the degree of influence of a feature exceeds a preset reference value, the determination unit may determine to reduce the corresponding feature. For example, the determination unit may calculate the cybersickness score of the VR content based on feature information of each cybersickness precipitating factor, and may analyze the weight of the calculated cybersickness score for each feature information to determine a cybersickness precipitating factor of which the weight is not less than a preset reference value, for the feature information of each cybersickness precipitating factor.

A reduction unit reducing each feature performs cybersickness reduction on the feature information of each of cybersickness precipitating factors based on deep learning in consideration of the VR content and whether to reduce the corresponding feature determined by the determination unit.

At this time, the reduction unit may reduce feature information of the corresponding cybersickness precipitating factor, using a neural network (e.g., deep learning neural network) of a pre-modeled learning model for performing reduction, with respect to each of the cybersickness precipitating factors for performing cybersickness reduction determined by the determination unit, and may sequentially perform this reduction process on each of the cybersickness precipitating factors for performing cybersickness reduction.

Figure 3:
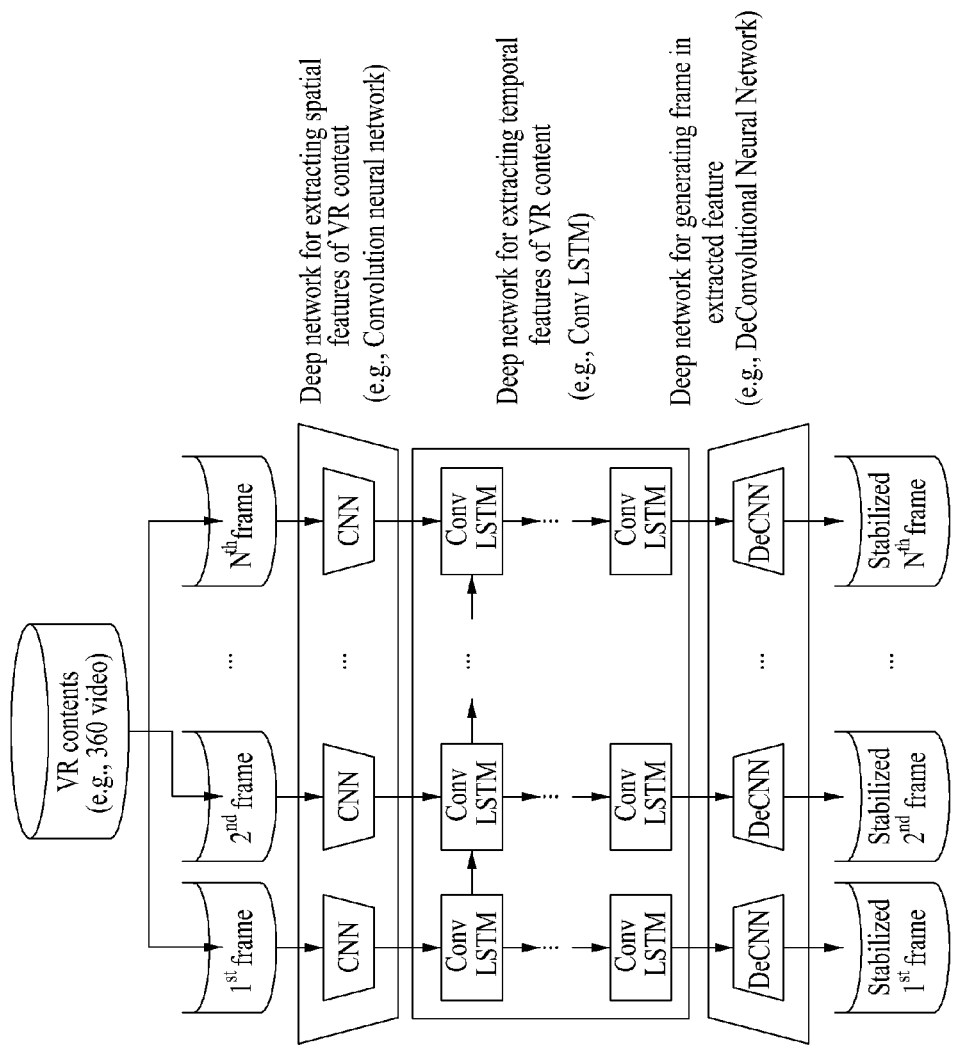
FIG. 3 illustrates an exemplary diagram for a motion stabilization deep neural network for reducing cybersickness caused by a rapid motion.
Figure 4:
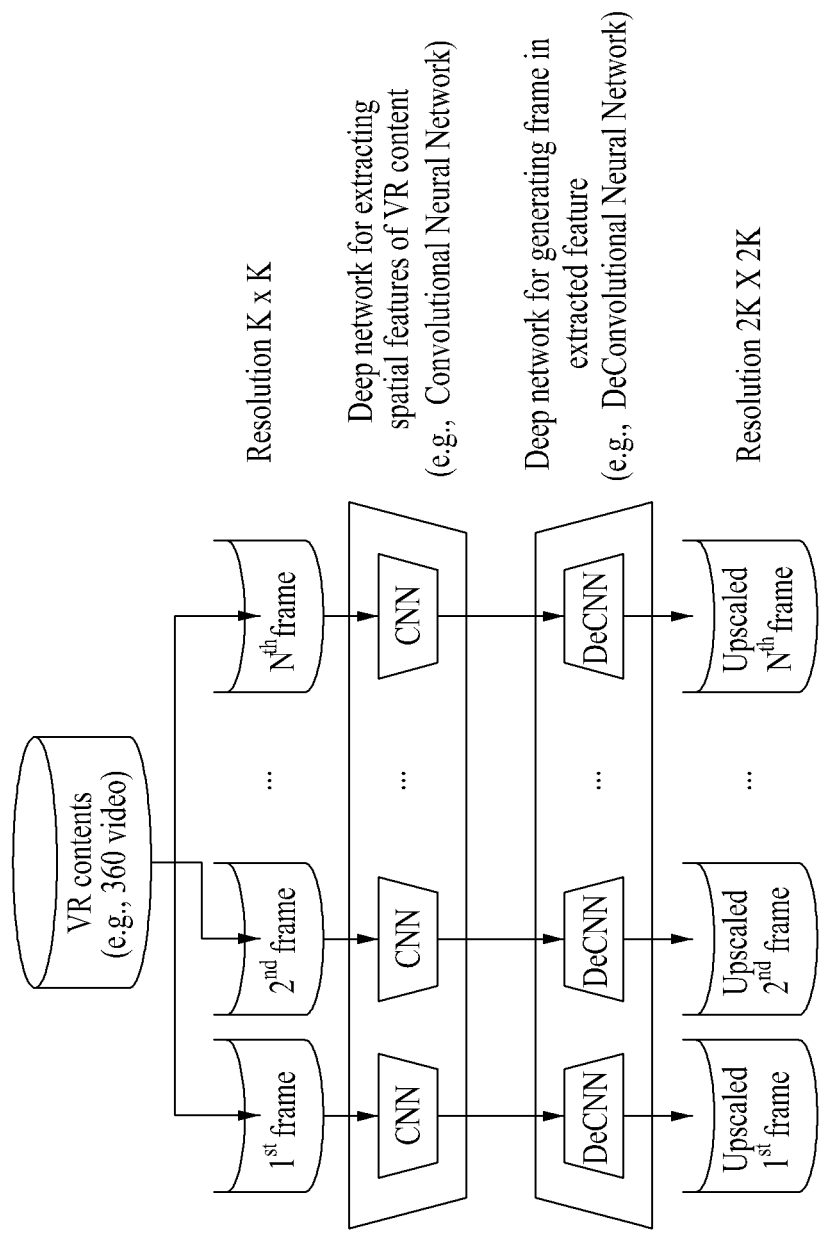
FIG. 4 illustrates an exemplary diagram for a high-resolution deep neural network for reducing cybersickness caused by a low resolution.
Figure 5:
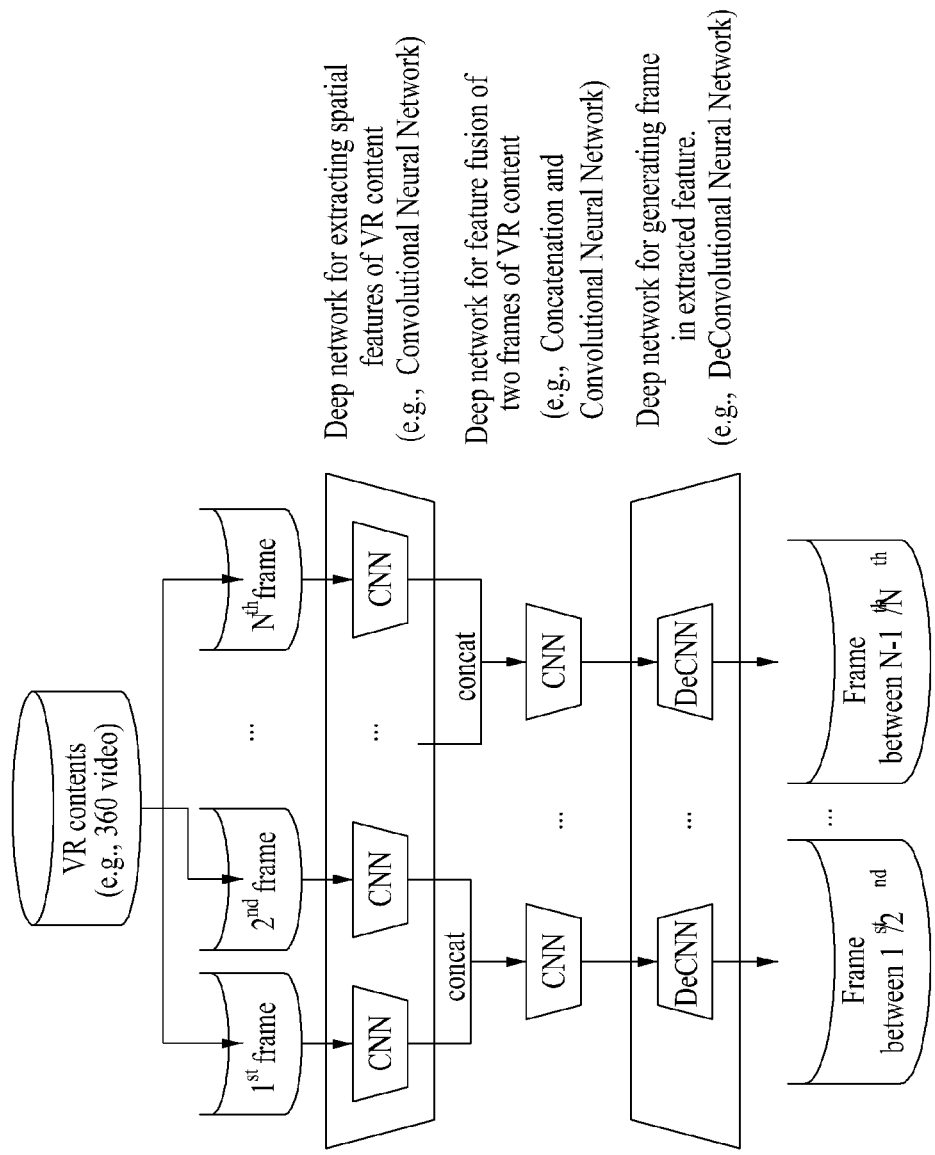
FIG. 5 illustrates an exemplary diagram for a frame interpolation deep neural network for reducing cybersickness caused by a low frame rate.

For example, in FIG. 2, when the cybersickness precipitating feature 1, the cybersickness precipitating feature 2, and the cybersickness precipitating feature N are determined as cybersickness precipitating factors for performing cybersickness reduction, the reduction unit reduces the cybersickness element of the VR cybersickness precipitating feature 1, using a deep learning-based neural network (e.g., the motion stabilization deep neural network illustrated in FIG. 3) for VR content, reduces the cybersickness element of the VR cybersickness precipitating feature 2, using a deep learning-based neural network (e.g., the high-resolution deep neural network illustrated in FIG. 4) for VR content in which the cybersickness element of the VR cybersickness precipitating feature 1 is reduced, and reduces the cybersickness element of the VR cybersickness precipitating feature N, using a deep learning-based neural network (e.g., the frame interpolation deep neural network illustrated in FIG. 5) for VR content in which the cybersickness element of the VR cybersickness precipitating feature 1 and the cybersickness element of the VR cybersickness precipitating feature 2 are reduced. Accordingly, the reduction unit generates the VR content with the reduced cybersickness elements.

This reduction unit may provide efficiency by performing reduction only when it is determined there is a need to reduce the corresponding feature. At this time, in the reduction unit, motion stabilization, high-resolution, and frame interpolation deep neural network structures may be used to mitigate cybersickness precipitating features such as a rapid motion, a low resolution, and a low frame rate.

FIG. 3 illustrates an exemplary diagram for a motion stabilization deep neural network for reducing cybersickness caused by a rapid motion. As illustrated in FIG. 3, the deep network for motion stabilization may be configured to include the deep network (e.g., convolutional neural network (CNN)), which is a spatial feature encoder for extracting spatial features of VR content, the deep network (e.g., Long Short-Term Memory (Cony LSTM)), which is a temporal feature encoder for extracting temporal features of VR content, and the deep network (e.g., deconvolutional neural network (DeCNN)) for generating the motion-stabilized frame in the extracted feature.

Herein, each deep network may generate a learning model for stabilizing motion through the training on motion information of VR content; each deep network may generate motion-stabilized frames for VR content, using the deep network based on each learning model.

That is, in FIG. 3, when the VR content has a motion feature of the standard cybersickness score or more, the frame of VR content may be generated as a frame with the reduced motion feature to have a cybersickness score of a preset reference motion or less or a cybersickness score of a reference cybersickness score or less.

FIG. 4 illustrates an exemplary diagram for a high-resolution deep neural network for reducing cybersickness caused by a low resolution. As illustrated in FIG. 4, the deep network for a high-resolution motion may be configured to include the deep network (e.g., CNN) for extracting spatial features of VR content, and the deep network (e.g., DeCNN) for generating the a high-resolution frame higher than the input resolution in the extracted feature. When the resolution of an input image is K×K, the deep neural network of FIG. 4 may upscale the input image to a resolution of 2K×2K to generate each high-resolution frame, and thus may generate high-resolution VR content, thereby reducing the cybersickness precipitating factor that may occur due to a low resolution.

Herein, a learning model for upscaling each frame through the training for high-resolution VR content may be generated; each deep network may generate upscaled-resolution frames for VR content, using the deep network based on each learning model generated thus.

That is, in FIG. 4, when the VR content has a resolution feature of the reference cybersickness score or more, the resolution for the frame of VR content may be upscaled to a predetermined high resolution.

FIG. 5 illustrates an exemplary diagram for a frame interpolation deep neural network for reducing cybersickness caused by a low frame rate. As illustrated in FIG. 5, the deep network for frame interpolation may be configured to include the deep network (e.g., CNN) for extracting spatial features of VR content, a deep network (e.g., Concatenation and CNN) for feature fusion of two frames of VR content, and a deep network (e.g., DeCNN) for generating an interpolation frame in the extracted feature.

Herein, a learning model for generating an interpolation frame through the training for improving the frame rate of VR content may be generated; each deep network may generate an interpolation frame for VR content, using the deep network based on each learning model generated thus, thereby improving the frame rate of VR content.

That is, in FIG. 5, when the VR content has a frame rate feature of the standard cybersickness score or more, the interpolation frame may be generated such that the VR content has a cybersickness score of a predetermined reference motion or less or a reference cybersickness score or less.

Each reduction network configuration for reducing the cybersickness precipitating factor described in FIGS. 3 to 5 is not limited to the specific deep network structure described above, and may use all neural network structures of the corresponding function (i.e., the function to reduce the cybersickness precipitating factor).

As described above, the VR cybersickness reduction module may reduce the cybersickness element corresponding to each cybersickness precipitating factor, such as smoothing the motion of VR content, increasing a resolution, interpolating frames, or the like.

As such, according to embodiments of the inventive concept, a system or apparatus may extract feature information of each of cybersickness precipitating factors through VR content analysis, and may reduce the cybersickness precipitating feature of the corresponding VR content using a deep learning neural network based on the extracted feature information.

The conventional technology reduces all cybersickness precipitating factors based on the final cybersickness score. Therefore, the conventional technology has an inefficiency in which the reduction is applied even to an element that does not actually cause cybersickness; the inventive concept adds a process of determining whether to analyze a precipitating feature that affects actual cybersickness and thus is implemented such that the reduction proceeds only for a specific cybersickness precipitating feature, thereby improving efficiency.

Moreover, according to embodiments of the inventive concept, a system or apparatus may allow viewers and VR content producers to effectively respond to VR content that causes cybersickness to create a safe viewing environment. For example, in the case of content that may cause extreme fatigue, the inventive concept may produce safe VR content for a user by adjusting the cybersickness precipitating factor (e.g., a low resolution); viewers who are sensitive to VR cybersickness may also watch safe VR content by adjusting the VR cybersickness precipitating level to be low, using the reduction function provided by VR content platform companies.

Figure 6:
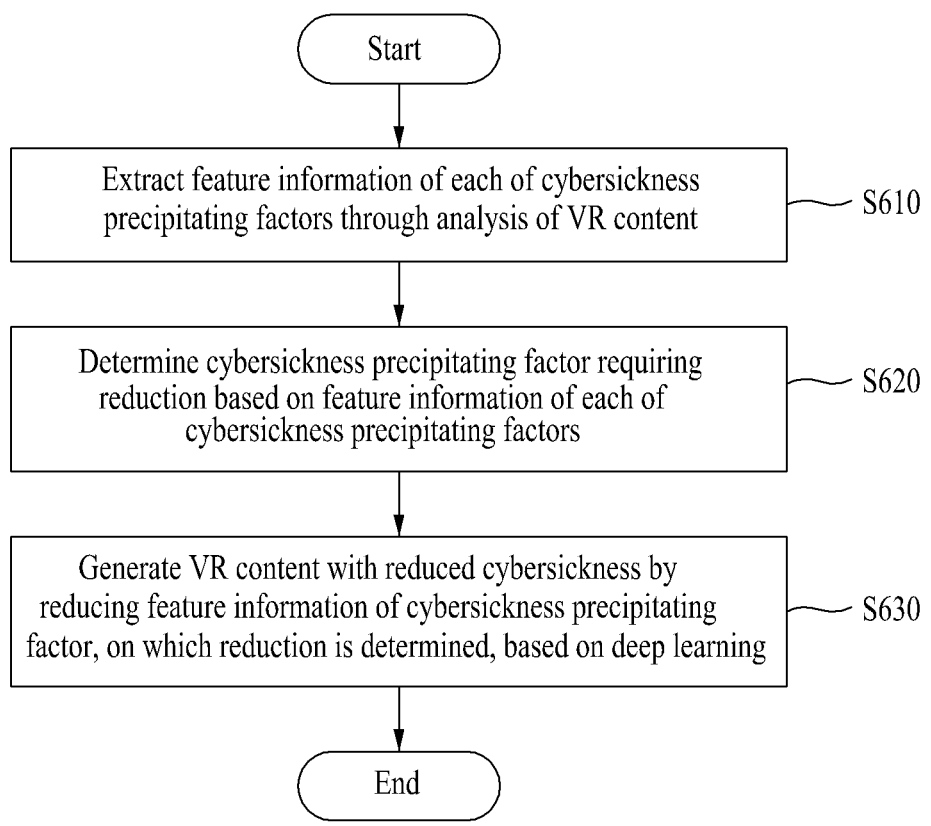
FIG. 6 illustrates an operation flowchart of a method for reducing VR content cybersickness, according to an embodiment of the inventive concept.

FIG. 6 illustrates an operation flowchart of a method for reducing VR content cybersickness, according to an embodiment of the inventive concept; FIG. 6 illustrates an operation flowchart in the apparatus or system of FIGS. 1 to 5.

Referring to FIG. 6, the method according to an embodiment of the inventive concept extracts feature information of each of cybersickness precipitating factors through the analysis of VR content (S610).

Herein, when the VR content is input, step S610 may analyze the input VR content based on deep learning to analyze each of cybersickness precipitating factors (e.g., a motion feature, a resolution feature, and a frame rate feature), and may extract each feature information.

When feature information of each of cybersickness precipitating factors is extracted in step S610, a cybersickness precipitating factor requiring reduction is determined based on the extracted feature information of each of the cybersickness precipitating factors (S620).

At this time, step S620 may calculate the cybersickness score of the VR content based on feature information of each of the cybersickness precipitating factors, and may analyze or calculate the weight of the calculated cybersickness score for each feature information to determine that a cybersickness precipitating factor, of which the weight is not less than a preset reference value, for the feature information of each cybersickness precipitating factor is a cybersickness precipitating factor requiring the reduction.

When the cybersickness precipitating factor requiring the reduction is determined in step S620, the VR content with the reduced cybersickness is generated by reducing the feature information of the cybersickness precipitating factor, on which the reduction is determined, based on deep learning (S630).

At this time, step S630 may perform cybersickness reduction on the corresponding feature information, using the deep learning neural network previously learned for each of the determined cybersickness precipitating factors, and thus may generate the VR content as VR content having a cybersickness score not greater than a predetermined reference cybersickness score.

Herein, step S630 may sequentially perform cybersickness reduction on each feature information of each of the determined cybersickness precipitating factors, with respect to VR content; step S630 may perform cybersickness reduction on the corresponding feature information, using a first deep neural network that generates the frame of VR content including a motion not less than a predetermined reference motion as a frame of VR content including a motion not greater than the reference motion, a second deep neural network upscaling the resolution of frames of VR content to a predetermined high resolution, and a third deep neural network that generates interpolation frames for frames of VR content in the case where the frame rate of VR content is lower than a predetermined reference frame rate.

Even though the description in the method in FIG. 6 is omitted, the method of FIG. 6 may include all the contents described in the apparatus or system of FIGS. 1 to 5, and this is obvious to those skilled in the art.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be embodied in any type of machine, components, physical equipment, virtual equipment, computer storage media or devices so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments may be recorded in computer-readable media including program instructions to implement various operations embodied by a computer. At this time, the medium may continuously store a program executable on a computer, or may be temporarily stored for execution or download. Besides, the medium may be various recording means or storage means in the form of a piece or pieces of hardware are coupled. The medium is not limited to a medium directly accessed to a computer system, and may be distributed on a network. For example, the medium may include magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), flash memories, and the like, and may be configured to store and execute program instructions. Moreover, as examples of other media include an appstore for distributing applications, a site for supplying or distributing various pieces of software, and a recording medium or storage medium managed by a server.

While embodiments have been shown and described with reference to the accompanying drawings, it will be apparent to those skilled in the art that various modifications and variations may be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

According to embodiments of the inventive concept, it is possible to extract feature information of each of cybersickness precipitating factors through VR content analysis, and to reduce the cybersickness precipitating feature of the corresponding VR content using a deep learning neural network based on the extracted feature information. That is, the inventive concept may analyze feature information of each of cybersickness precipitating factors that cause fatigue and cybersickness in VR content, using a deep learning neural network and may reduce the cybersickness factor of VR content to an appropriate level using the analyzed feature information.

According to embodiments of the inventive concept, viewers and VR content producers may effectively respond to VR content that causes cybersickness to create a safe viewing environment.

The inventive concept may be utilized throughout a VR market such as digital content production, digital content providing platform, virtual reality, medical facilities, broadcasting and multimedia, entertainment, viewing safety standardization, and the like, by suggesting a technology for automatically analyzing VR content to reduce cybersickness factors.

The VR content may provide a user with excellent realistic immersion; on the other hand, an object on content, camera movement, resolution, frame rate, or the like may cause viewers to feel fatigue. Accordingly, VR content production companies need to produce the VR content balanced between the immersion of content and the user's fatigue. When the inventive concept is used, VR content production companies may quickly and efficiently reduce the cybersickness of VR content produced by companies to a desired level, without spending labor or long time.

In the case of content that is likely to cause extreme fatigue using the inventive concept, it is possible to produce safe VR content for users by adjusting a cybersickness precipitating factor, for example, low resolution.

VR content platform companies may allow viewers to directly reduce cybersickness to the desired level by providing VR content viewers with a function to reduce cybersickness. Accordingly, it is possible to watch VR content with a balance of appropriate immersion and fatigue to be matched with individual tastes.

In the case of a viewer who is sensitive to VR cybersickness using the inventive concept, it is possible to watch safe VR content by reducing the VR cybersickness precipitating level, using the reduction function provided by the VR content platform companies.

When VR equipment companies play VR content through VR playback equipment, in the case where the content is an image that causes extreme fatigue, it is possible to provide a user with a viewing safety function to show VR content with the reduced cybersickness precipitating factor, by reducing the cybersickness factor identified through the inventive concept in the playback device (e.g., increasing the resolution and frame rate).

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An apparatus for reducing virtual reality (VR) content cybersickness, the apparatus comprising:
    a first module configured to extract feature information about each of predetermined cybersickness precipitating factors through analysis of VR content; and
    a second module configured to:
        determine a cybersickness precipitating factor requiring cybersickness reduction among the cybersickness precipitating factors based on the extracted feature information about each of the cybersickness precipitating factors; and
        generate the VR content as VR content having a cybersickness score not greater than a predetermined reference cybersickness score, by performing the cybersickness reduction on corresponding feature information, using a deep learning neural network pre-learned for each of the respective determined cybersickness precipitating factor,
    wherein the second module calculates a cybersickness score of the VR content based on the feature information of each of the cybersickness precipitating factors, calculates a gradient size in each feature information about the calculated cybersickness score, and determines a cybersickness precipitating factor requiring the cybersickness reduction by analyzing influence information of the respective feature information about the cybersickness score based on the calculated gradient size.

2. The apparatus of claim 1, wherein the first module analyzes the VR content based on deep learning, and extracts the feature information about each of the cybersickness precipitating factors including a motion feature, a resolution feature, and a frame rate feature.

3. The apparatus of claim 1, wherein the second module generates the VR content as the VR content having the cybersickness score not greater than the predetermined reference cybersickness score, by sequentially performing the cybersickness reduction for feature information of the respective determined cybersickness precipitating factor on the VR content.

4. An apparatus for reducing virtual reality (VR) content cybersickness, the apparatus comprising:
    a first module configured to extract feature information about each of predetermined cybersickness precipitating factors through analysis of VR content; and
    a second module configured to:
        determine a cybersickness precipitating factor requiring cybersickness reduction among the cybersickness precipitating factors based on the extracted feature information about each of the cybersickness precipitating factors; and generate the VR content as VR content having a cybersickness score not greater than a predetermined reference cybersickness score, by performing the cybersickness reduction on corresponding feature information, using a deep learning neural network pre-learned for each of the respective determined cybersickness precipitating factor, wherein the second module includes:
a first deep neural network generating a frame of the VR content as a frame of a predetermined reference motion or less when the VR content has a motion feature of the predetermined reference cybersickness score or more;

a second deep neural network upscaling a resolution for the frame of the VR content to a predetermined high resolution when the VR content has a resolution of the reference cybersickness score or more; and a third deep neural network generating an interpolation frame for frames of the VR content when the VR content has a frame rate of the reference cybersickness score or more.

5. A method for reducing VR content cybersickness, the method comprising:

extracting feature information about each of predetermined cybersickness precipitating factors through analysis of VR content; and determining a cybersickness precipitating factor requiring cybersickness reduction among the cybersickness precipitating factors based on the extracted feature information about each of the cybersickness precipitating factors; and generating the VR content as VR content having a cybersickness score not greater than a predetermined reference cybersickness score, by performing the cybersickness reduction on corresponding feature information, using a deep learning neural network pre-learned for each of the respective determined cybersickness precipitating factor, wherein the determining includes:
calculating a cybersickness score of the VR content based on the feature information of each of the cybersickness precipitating factors;

calculating a gradient size in each feature information about the calculated cybersickness score; and determining a cybersickness precipitating factor requiring the cybersickness reduction by analyzing influence information of the respective feature information about the cybersickness score based on the calculated gradient size.

6. The method of claim 5, wherein the extracting includes:
analyzing the VR content based on deep learning; and
extracting the feature information about each of the cybersickness precipitating factors including a motion feature, a resolution feature, and a frame rate feature.

7. The method of claim 5, wherein the generating includes:
generating the VR content as the VR content having the cybersickness score not greater than the predetermined reference cybersickness score, by sequentially performing the cybersickness reduction for feature information of the respective determined cybersickness precipitating factor on the VR content.

8. The method of claim 5, wherein the generating includes:
performing the cybersickness reduction for the corresponding feature information, using a first deep neural network generating a frame of the VR content as a frame of a predetermined reference motion or less when the VR content has a motion feature of the predetermined reference cybersickness score or more, a second deep neural network upscaling a resolution for the frame of the VR content to a predetermined high-resolution when the VR content has a resolution of the reference cybersickness score or more, and a third deep neural network generating an interpolation frame for frames of the VR content when the VR content has a frame rate of the reference cybersickness score or more.

* * * * *